Feb. 8, 1944.                C. H. H. RODANET                2,341,118
                        VEHICLE SPEED RECORDER
                    Filed June 4, 1940          4 Sheets-Sheet 2
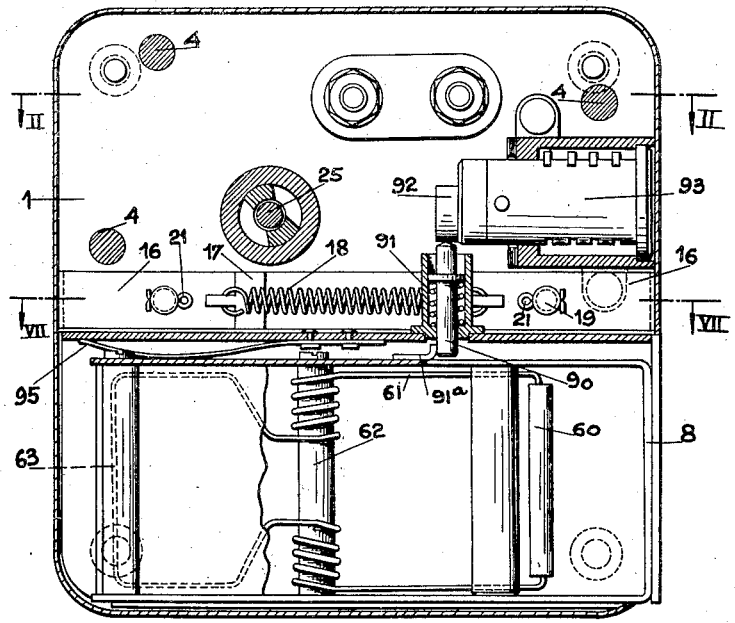
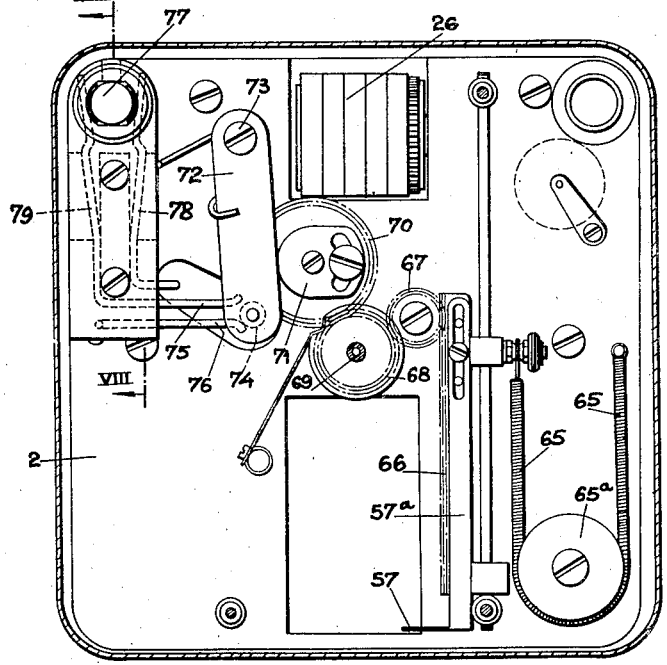
INVENTOR:
CHARLES HILAIRE HENRI RODANET
BY Haseltine Lake & Co
ATTORNEYS Feb. 8, 1944. C. H. H. RODANET 2,341,118
VEHICLE SPEED RECORDER
Filed June 4, 1940 4 Sheets-Sheet 3

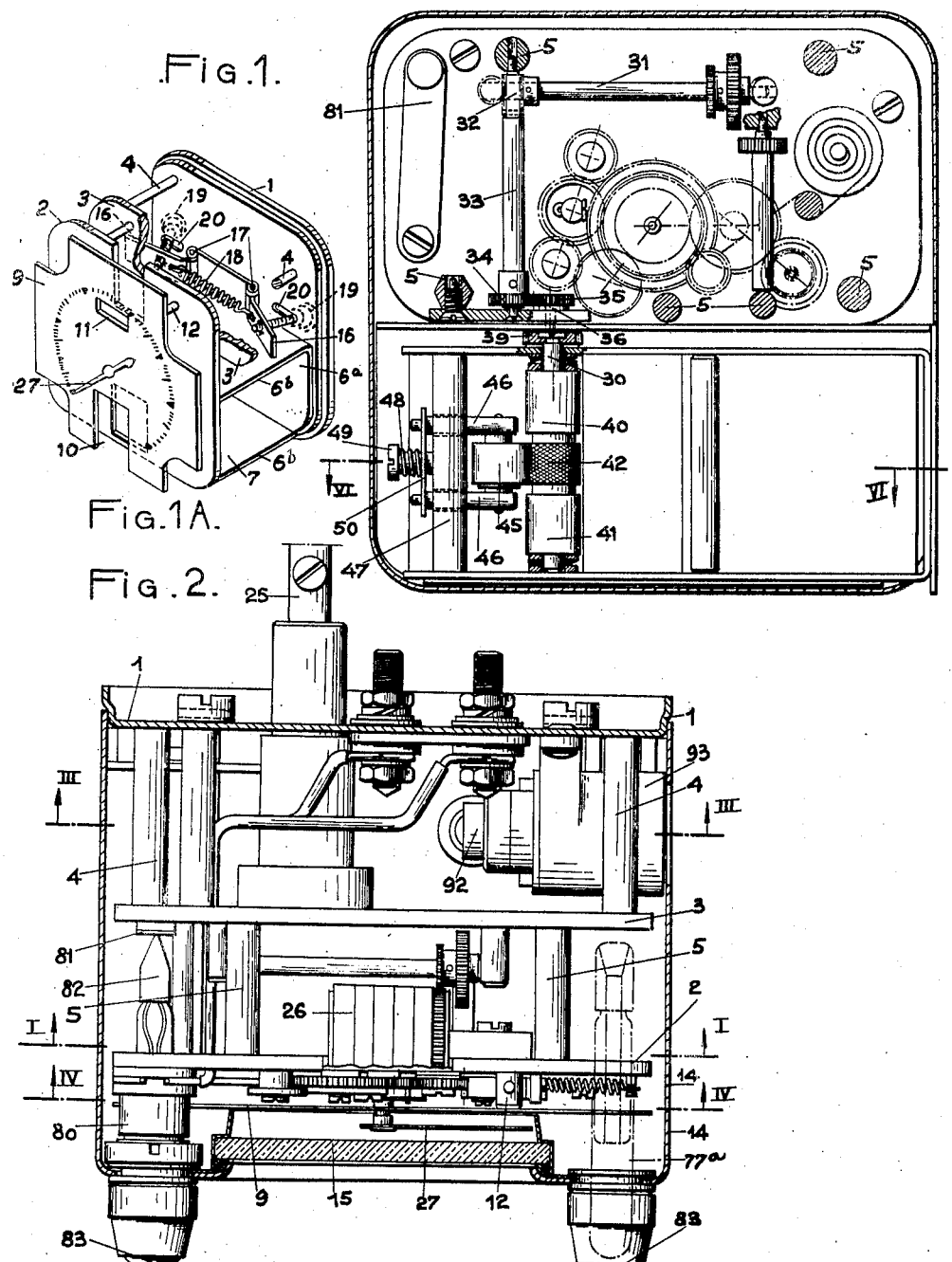

INVENTOR:
CHARLES HILAIRE HENRI RODANET
Haseltine Lake & Co.
ATTORNEYS

Feb. 8, 1944.    C. H. H. RODANET    2,341,118
VEHICLE SPEED RECORDER
Filed June 4, 1940    4 Sheets-Sheet 4

INVENTOR:
CHARLES HILAIRE HENRI RODANET
BY Haseltine Lake & Co.
ATTORNEYS

Patented Feb. 8, 1944

2,341,118

UNITED STATES PATENT OFFICE 2,341,118

VEHICLE SPEED RECORDER

Charles Hilaire Henri Rodanet, Neuilly-sur-Seine, France; vested in the Alien Property Custodian Application June 4, 1940, Serial No. 338,695
In France June 14, 1939

3 Claims. (Cl. 234—30)

The present invention has for object an apparatus for recording the speed of a vehicle. Said apparatus is of the type in which use is made in combination: of a totalizing meter, an instantaneous speed indicator and a system for recording said speed.

This apparatus is mainly characterized by the following points applied separately or in any combinations:

(a) The recording of the instantaneous speed is insured by a stylus movable in translation and the position of which is function of that of the index indicating said speed, said stylus moving opposite a strip of paper which unwinds at a reduced speed, proportional to that of the vehicle and transversely to the displacements of the stylus, the indications traced by the latter being visible through an opening or notch formed in the dial of the apparatus.

(b) The roll of paper is placed in a removable drawer, locked by a safety lock.

(c) The paper strip bearing the recording is stored, after passing opposite the observation port, in a housing of the drawer, and said recorded part can be separated from the remainder of the strip after the drawer has been removed.

(d) The driving of the paper strip is insured by clamping it between a resiliently mounted roller and a driving roller the shaft of which comprises a toothed wheel located outside the drawer and which comes in engagement with a corresponding driving wheel kinematically connected to the transmission shaft of the recording speedometer.

(e) A cam, adjustable in position, kinematically connected to the index indicating the instantaneous speed, acts, as soon as a given speed is reached, to close the circuit of a signalling lamp placed on the apparatus.

(f) The casing of the apparatus, provided with a protecting glass plate, holds the signalling lamp which is subjected to the action of a spring, in position, after assemblage on the base plate.

(g) The casing is locked in position, by pivoted bolts urged to open position by a spring and held in locked position behind projections or abutments of the casing, through the medium of screws permanently mounted on said bolts.

The invention also extends to other particular points which will appear in the following text given with reference to the accompanying drawings, by way of example only, in which:

Fig. 1 is a general elevation with section made according to line I—I of Fig. 2.

Figure 1A is an isometric view, with portions thereof in section and other portions omitted, illustrating the base member, the associated dial, and the upper and lower compartments.

Fig. 2 is a section made according to line II—II of Fig. 3 or of Fig. 5.

Fig. 3 is a section made according to line III—III of Fig. 2 or of Fig. 5.

Fig. 4 is a section made according to line IV—IV of Fig. 2 or of Fig. 5.

Figure 5:
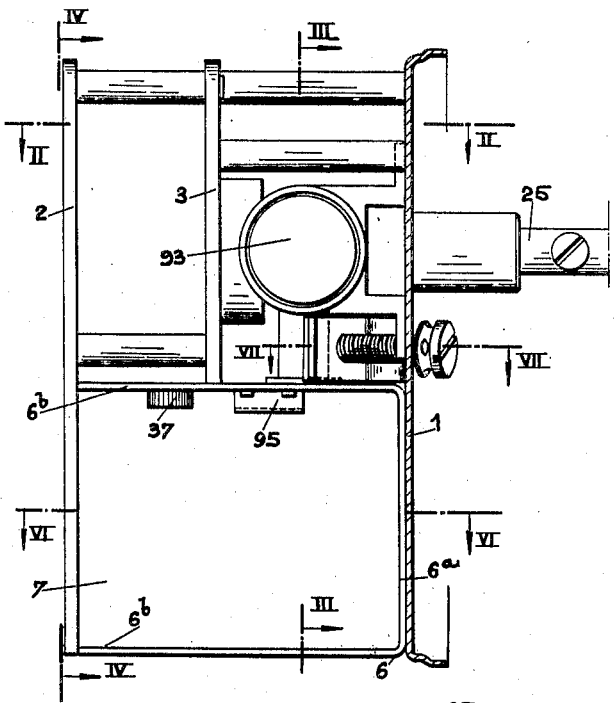
Fig. 5 is a side view, the drawer being removed.

The recording speedometer, illustrated by way of example only, comprises a base plate or rear plate 1, a front plate 2 and an intermediate plate 3 extending only in the upper region. The rear plate 1 and the intermediate plate 3 are connected by rods 4 and the front plate 2 is connected to the intermediate plate 3 by rods 5. Moreover, between the front and rear plates 2 and 1, below the intermediate plate 3 is arranged a U-shaped wall 6 the bottom 6ᵃ of which is rigidly secured to the rear plate 1 and the lateral walls or branches 6ᵇ of which extend up to the front plate 2 so as to constitute a rectangular channel or tunnel 7 (Fig. 5) in which can be engaged, by a movement of translation, a drawer 8.

Figure 7:
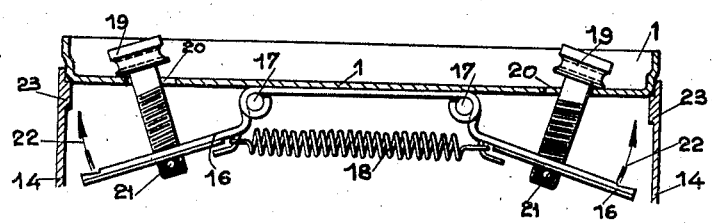
Fig. 7 is a section made according to line VII—VII of Fig. 3 or of Fig. 5.
Figure 8:
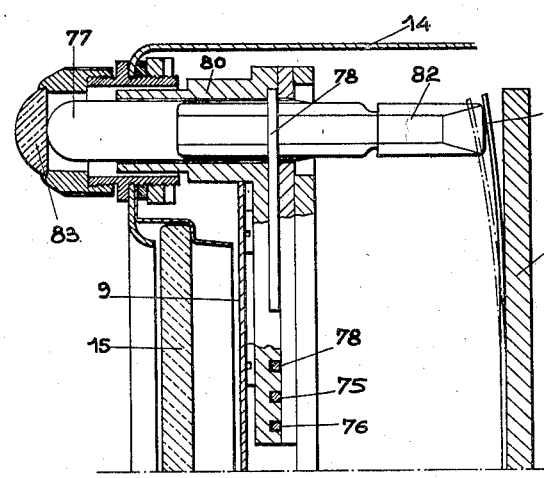
Fig. 8 is a section, on an enlarged scale, made according to line VIII—VIII of Fig. 4.
Figure 9:
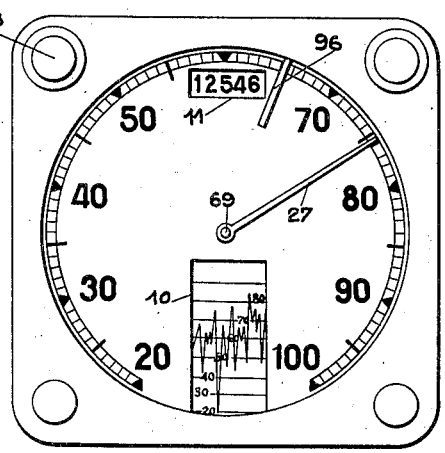
Fig. 9 is a front view of the apparatus, but on a smaller scale.
Figure 10:
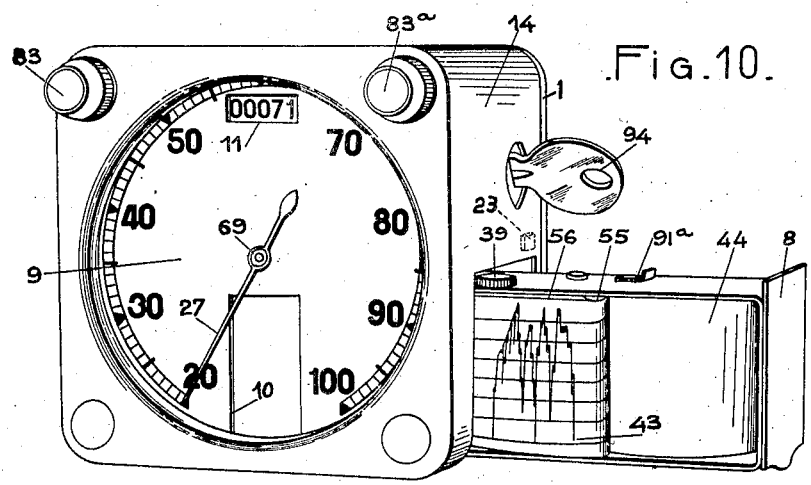
Fig. 10 is a general perspective view, the drawer being partly disengaged.

In front of the plate 2 is arranged a dial 9 provided with a lower notch 10 and an upper port 11, said dial being secured in position on said plate 2 by rods 12. A casing 14, fitting over the base plate 1, is provided with a protecting glass plate 15 and it is held stationary in position by pivoted members 16. Said members 16, two in number, are oppositely arranged and they are pivoted at 17 on the base plate 1. Said members, the inoperative position of which is more particularly illustrated in Fig. 7, are constantly urged in said position by a common spring 18. On said members are threadably secured screws 19, passing through oblong ports 20 formed in the base plate 1 and which cannot be completely disengaged from the members owing to the fact that they each comprise a stop pin 21.

The angular displacement, in the direction of the arrows 22 of the members 16 is determined by screwing the screws 19, the ends of said members engaging with inner projections or stop abutments 23 rigid with the casing 14 so as to prevent the dismantling of said casing which is rigidly held in position on the base plate 1.

The recording speedometer comprises, in the usual manner, a drive 25 controlling, through the medium of suitable means and which are of no importance for the invention, on the one hand, a totalizing meter the indicating drums of which are illustrated at 26 and, on the other hand, an index 27 indicating the instantaneous speed, moving over the dial 9. The intermediate movement transmitting mechanisms interposed between the drive 25, the drums 26 and the spindle of the index 27, are illustrated in the drawings but will not be described as they are of the type currently used in the art and the improvements forming the subject-matter of the present application do not relate to these mechanisms. It will be noted that the indications given by the totalizer 26 are visible through the port 11 provided at the upper part of the dial 9.

According to the invention, the control of a shaft 30 journalled in the drawer 8 is derived from the drive 25. This transmission is effected by a shaft 31 cut so as to constitute a worm meshing with a set of teeth 32 formed at the end of a shaft 33 carrying a pinion 34 meshing with a pinion 35. On the shaft 36 of pinion 35 is rigidly secured a pinion 37 which is more particularly shown in Fig. 5 and which projects within the channel 7. When the drawer 8 is mounted in position in the channel 7, a pinion 39, fast on the shaft 30, engages with the driving pinion 37.

Figure 6:
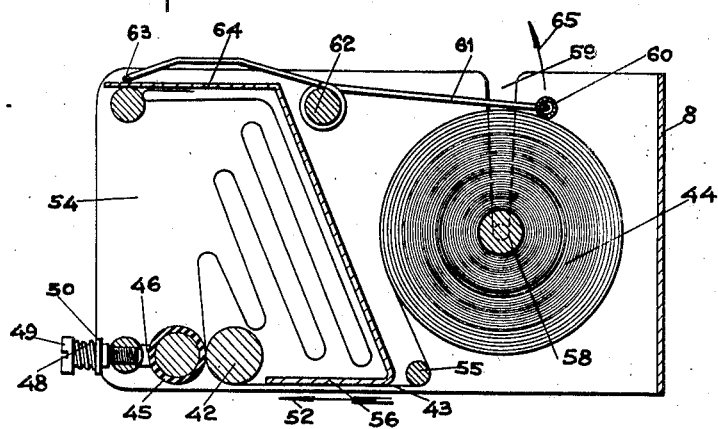
Fig. 6 is a section made according to line VI—VI of Fig. 1 or of Fig. 5.

The shaft 30, which is thus rotatively driven at a reduced speed but proportional to the speed of the drive 25, is devised to constitute two smooth co-axial rollers 40 and 41 and an intermediate milled roller 42 for effecting the feeding of a paper strip 43 (Fig. 6). This strip 43, which is previously wound to form a roll 44, engages at its unwinding end between a counter-roller or pressure roller 45 and the triple roller 40, 41 and 42, the roller 45 being arranged opposite the milled roller 42. Said pressure roller 45 is journalled in slide-blocks 46 movable in translation in corresponding perforations formed in a stay member 47 of the drawer 8. Said slide-blocks 46 are constantly urged in one direction, towards the roller 42, through the medium of a spring 48 taking a bearing, on the one hand, on the head of a screw 49, mounted on the stay member 47 and, on the other hand, on a plate 50 pressing at its ends on the two slide-blocks 46. The paper strip 43 is thus fed by the roller 42 against which it is pressed by the roller 45 so as to move in the direction of the arrow 52. After passing between the roller 42 and the roller 45, the strip and the recording thereon is stored in a housing 54 of the drawer 8 as more particularly shown in Fig. 6.

Before engaging between the roller 42 and the roller 45, the strip 43 passes over a guiding roller 55 and on a recording table 56, the recording stylus 57 being pressed on the strip 43 resting on said table 56.

The paper roll 44 is mounted on a spindle 58 engaged, by means of lateral grooves 59, in the drawer 8, said spindle being pressed against the bottom forming bearings of said grooves by a roller 60 resiliently held on the periphery of the roll 44.

Said roller 60 is mounted on a resiliently distortable wire 61 pivoted and wound on a shaft 62 mounted on the drawer and which takes a bearing at 63 on the bottom 64 of the housing 54. For mounting the roll 44 in position, the roller 60 and the wire 61 are lifted in the direction of the arrow 65, the roller 60 resuming the position illustrated in Fig. 6, after the roll of paper 44 has been mounted in position. It will be noted that the peripheral roller 60 holds the paper roll 44 in position while insuring a slight braking action so as to avoid the accidental unwinding of the paper roll 44.

The stylus 57 is movable in translation at right angles to the direction of the displacement of the strip 43. Said stylus 57 is rigid with a rod 57a rigidly mounted on a rack 66 guided in translation and with which constantly meshes a pinion 67 meshing with a pinion 68 rigidly secured on the shaft 69 of the index 27 indicating the instantaneous speed; the stylus and its rack are restored to the position of rest by a long spring blade 65 passing over a pulley 65a.

With the pinion 68 also meshes a wheel 70 on which is rigidly secured, in an adjustable manner, a cam 71 which acts, as soon as the instantaneous speed has reached a given value, on a rocking arm 72, pivoted at 73 and constantly urged against said cam by a spring or any equivalent means. Said rocking arm 72 carries a contact member 74 which engages, when the arm 72 has moved sufficiently, between contact blades 75 and 76, in order to close the circuit of a signalling lamp 77. Said lamp 77 is clamped between two resilient distortable contact rods 78 and 79. The rod 78 is connected to the source of current and the rod 79 is constituted by the extension of the contact blade or rod 75, the blade 76 being connected to earth.

It will also be noted that the lamp 77, which is engaged in an insulating member 80 secured on the plate 2, is constantly urged by a resiliently distortable blade 81 acting on its inner end 82, against a red signalling glass plate 83 secured on the front face of the casing 14.

Another glass plate 83a symmetrical to the glass plate 83 relatively to the vertical axial plane, is arranged opposite a spare lamp 77a.

The drawer 8 is locked in position by a latch 90 (Fig. 3) constantly urged in unlocked position by a spring 91 and which can press behind an abutment 9a rigid with the drawer 8. Said latch 90 is brought into locking position, in antagonism to the action of the spring 91, as more particularly shown in Fig. 3, by a cam 92 of a safety bolt 93 actuated by a key 94. It will be noted that the drawer 8 is constantly held on the lower face of the channel 7 by a spring 95 so as to prevent any vibration and allow an accurate recording.

On the dial 9 is provided a reference mark 96 indicating to the driver of the vehicle the upper speed limit which the vehicle must not exceed.

The use of the recording speedometer previously described is as follows:

The owner of the lorry, after placing the paper roll 44 in position in the drawer 8, passes the end of the strip 43 between the driving roller 42 and the pressure roller 45. The owner then engages the drawer 8 in the channel 7 and locks said drawer in position as shown in Fig. 3 by actuating the key 94 which he keeps. The placing in position of the drawer 8 has automatically caused the pinion 39 fast on the shaft 30 to mesh with the driving pinion 37.

If the driver of the vehicle exceeds for instance the speed of 65 kilometers an hour, indicated by the reference mark 96, he is warned thereof, on the one hand, owing to the fact that the index 27 passes beyond said reference mark and, on the other hand, by the lamp 77 being placed in circuit and which lights. Furthermore, the instantaneous speed of the vehicle is recorded at every instant on the strip 43 which preferably bears longitudinal lines marked out in kilometers per hour, so that an excess of speed is immediately recorded, said recording then passing opposite the notch 10 formed in the dial.

When the vehicle has returned, the owner can verify the recording by pulling out the drawer. He then separates the recorded part and replaces the drawer which is locked again.

It is obvious that the embodiment described and illustrated is given herein only by way of indication and not in a limiting sense. All modifications or changes which do not alter in any way the main features above set forth or the desired result remain included in the scope of the present invention.

What I claim as my invention and desire to secure by Letters Patent is:

1. In an apparatus for recording the speed of a vehicle of the type having a dial and a graphic recording device and being provided with feeding means for a record strip, the combination, with a base member carrying said dial and said recording device, a casing cooperating with said base member for enclosing said dial and recording device, and a removable drawer in said casing, constituting a frame for directly supporting said feeding means and said record strip, said dial having means for exposing therethrough at least a portion of the record strip to view.

2. In an apparatus for recording the speed of a vehicle of the type having a dial and a graphic recording device and being provided with feeding means for a record strip, the combination, with a base member carrying said dial and said recording device, a casing cooperating with said base member for enclosing said dial and recording device, a wall carried by said base member thereby subdividing the enclosed space into an upper and a lower compartment, said casing having an opening therein communicating with one of said compartments in said casing, a drawer for supporting said feeding means and record strip, said dial having means for exposing therethrough at least a portion of the record strip to view, and said drawer being slidably mounted in said casing opening and also in one of said compartments, and interengaging means between said sliding drawer and the interior of its associated compartment for releasably holding said drawer in position.

3. In an apparatus for recording the speed of a vehicle of the type having a dial and a graphic recording device and being provided with feeding means for a record strip, the combination with a base member carrying said dial, said dial having a window therein, a casing cooperating with said base member for enclosing said dial and recording device, a slidable drawer mounted in said casing and being positioned adjacent said window, a recording table on said drawer over which said strip passes, said table being positioned opposite said window, and means carried by said drawer for guiding said strip while passing over said table in a plane substantially parallel to the plane of said dial, and means supported by said base member and cooperating with said strip for making a record on the strip.

CHARLES HILAIRE HENRI RODANET.